United States Patent [19]

Kaiser

[11] Patent Number: 5,367,246

[45] Date of Patent: Nov. 22, 1994

[54] ELECTRONIC ENERGY SAVING DEVICE

[76] Inventor: Hans J. Kaiser, 2200 NW. 32nd St., Suite 400, Pompano Beach, Fla. 33069

[21] Appl. No.: 16,891

[22] Filed: Feb. 12, 1993

[51] Int. Cl.$^5$ .............................................. G05F 5/02
[52] U.S. Cl. ................................. 323/212; 323/207; 363/39
[58] Field of Search ............... 323/212, 213, 214, 215, 323/216, 217, 218, 207; 363/39, 40

[56] References Cited

U.S. PATENT DOCUMENTS

| | | | |
|---|---|---|---|
| 4,446,512 | 5/1984 | Jarvinen | 363/39 |
| 4,752,726 | 6/1988 | Aoyama et al. | 323/207 |
| 4,812,669 | 3/1989 | Takeda et al. | 307/105 |
| 4,857,830 | 8/1989 | Matsuno | 324/62 |
| 5,198,746 | 3/1993 | Gyugi et al. | 323/207 |

FOREIGN PATENT DOCUMENTS 0010079  2/1981  Japan ................................. 323/207

Primary Examiner—Steven L. Stephan
Assistant Examiner—Adolf Berhane
Attorney, Agent, or Firm—Oltman and Flynn

[57] ABSTRACT

An automatic power factor correcting device for correcting the power factor of a load connected to a power line having a plurality of confuctors including a neutral conductor, a power line interface circuit for interfacing the device with the power line, a phase sensing circuit connected via the interface circuit to at least two of the conductors for sensing a phase shift between voltage and current in the two conductors. It further includes a phase correction circuit with a plurality of weighted capacitors, and capacitor connecting means having a control input connected to the phase sensing circuit for connecting at least one of the weighted capacitors to the power line for correcting the phase shift on the two conductors.

16 Claims, 6 Drawing Sheets

ELECTRONIC ENERGY SAVING DEVICE

The invention relates in general to energy saving devices, and in particular to a power factor correction circuit, which senses the reactive current drawn by a power load and provides a correcting reactive current of opposite phase which cancels the reactive current drawn by the load, thereby reducing the overall power drawn from the power mains.

BACKGROUND AND PRIOR ART

It is well known that most electrical loads, in particular motors and fluorescent lights, present a load to the power mains that have an inductive component besides the purely resistive component. The reactive component draws a current that is out of phase with the resistive component, i.e. for inductive loads the current lags the voltage by a certain phase angle. As a result, inductive loads draw a certain amount of current for which the user pays the power company, but is of no use to him, since the inductive component of the current does not represent any useful power, but only loss in power wiring and in the load.

This inductive load component is commonly referred to as the "power factor" of the load. The power factor is defined as the cosine of the phase angle between the voltage vector and the current vector. A large power factor, as close to one as possible is desired, while a small power factor indicates an inefficient coupling between the load and line.

The major loads in large households, business establishments, office buildings, factories, and so on are mostly inductive, e.g. motors driving air conditioner, pumps, machinery and also fluorescent and other electric arc type lights having a large inductive component.

It is also well known that a capacitive load of the proper value applied in parallel with an inductive load generates a capacitive current that leads the voltage vector and thereby is capable of cancelling the inductive component of the current.

SUMMARY OF THE INVENTION

It is, accordingly, a primary object of the invention to provide an energy saving device that can be connected to a load or a group of loads and is capable of automatically providing the power factor correcting current of a magnitude that closely cancels the inductive component of the load current, thereby providing a significant power saving.

SUMMARY OF THE INVENTION

According to the invention there is provided an automatic power factor correcting device for correcting the power factor of a load connected to a power line having a plurality of conductors including a neutral conductor, a power line interface circuit for interfacing the device with the power line, a phase sensing circuit connected via the interface circuitry to at least two of the conductors for sensing a phase shift between voltage and current in the two conductors, and a phase correction circuit with a plurality of weighted capacitors, and capacitor connecting means having a control input connected to the phase sensing circuit for connecting at least one of the weighted capacitors to the power line for correcting the phase shift on the two conductors.

The automatic power factor correcting device can additionally include in the phase sensing circuit a current sensing circuit coupled to a first one of the two conductors, and a voltage sensing circuit connected between a first and second one of the two conductors, first and second comparators having inputs respectively connected to the current sensing circuit and to the voltage sensing circuit, the first and second comparators generating respective first and second square wave signals representing, respectively, current in the first one of the two conductors and voltage between the first one of the two conductors and the neutral conductor, and further a combining circuit having first and second inputs respectively receiving the first and second square wave signals for forming a combined signal, an integrating circuit for integrating the combined signal connected to the combining circuit, forming an integrated output signal, wherein the integrated output signal forms a count signal.

According to a further feature the automatic power factor correcting device includes in the phase sensing circuit a lead-lag circuit for detecting whether the current is leading or lagging relative to the voltage between the first conductor and the neutral conductor, the lead-lag circuit including a flip-flop having a data input connected to the first square wave signal and a clock input connected to the second square wave signal, for setting the flip-flop during leading current conditions, and resetting the flip-flop during lagging current conditions, the flip-flop having an output for generating a direction-of-count signal.

According to still another feature, the automatic power factor correcting device includes a clock output in the voltage sense circuit, the clock output being connected to the second comparator for generating a clock signal, and additionally in the controlled capacitor connecting means a triac in series with each of the weighted capacitors, and a triac control circuit for controlling the triacs.

The automatic power factor correcting device includes in the triac control circuit an up-down counter having a direction input connected to the direction-of-count signal, and a clock signal input connected to the clock signal for driving the up-down counter in direction according to the direction-of-count signal, and a clock divide circuit having a clock input connected to the clock signal, clock dividing means in the clock divide circuit for dividing the clock signal by a given dividing number, and a divided clock output for providing a divided clock connected to the clock signal input of the up-down counter.

The automatic power factor correcting device having a clock divide circuit advantageously has a dividing number equal to 128.

The automatic power factor correcting device further includes a counter reset input in the clock divide circuit connected to the count signal, wherein the count signal has an inactive state, for resetting the clock divide circuit by the inactive state of the count signal, and a plurality of binary weighted outputs in the up-down counter, a plurality of triacs in the capacitor connecting means, wherein each triac has a gate connected to a respective one of the weighted outputs, and each triac is connected to a respective one of the plurality of weighted capacitors.

According to still another feature, the automatic power factor correcting device includes a plurality of triac drive amplifiers, wherein each drive amplifier has an amplifier input and an amplifier output, and a control gate on each of the triacs connected to a respective drive amplifier output, and wherein each of the amplifier inputs is connected to a respective binary weighted output of the up-down counter.

The automatic power factor correcting device may further include a metering circuit, a meter having an input, a plurality of binary weighted resistors each having a series-connected diode, wherein each of the binary weighted resistors has one end connected to a correspondingly weighted output of the up-down counter via a respective diode, and the other end of each resistor connected in series with the meter for indicating savings in watts being supplied by the correcting circuit, and in addition an accumulator for accumulating reactive volt-ampere hours supplied to the power line by the power factor correcting device, the accumulator circuit including a plurality of binary weighted resistors, each having a series connected diode, and each of the binary weighted resistors has one end connected via a respective diode to a correspondingly weighted output of the up-down counter, and the other end of each of the resistors connected to a common junction point, a voltage controlled oscillator having a frequency control input connected to the common junction point, and a variable frequency output, an accumulating counter connected to the voltage controlled oscillator, and display means having an input connected to the accumulating counter for displaying accumulated contents of the accumulating counter.

According to a further feature, the automatic power factor correcting device includes another clock divide circuit having a clock divide input connected to the clock output, a divided output, and a light indicator connected to the clock divide output for providing a flashing indication when the power factor correcting circuit is operating.

In the automatic power factor correcting device the plurality of conductors can include a first phase conductor, a neutral conductor and a second phase conductor, and wherein the first phase conductor carries voltage of opposite phase of the second phase conductor.

Further objects and advantages of this invention will be apparent from the following detailed description of a presently preferred embodiment which is illustrated schematically in the accompanying drawings.

BRIEF DESCRIPTION OF THE DRAWINGS

FIG. 6 is a diagrammatic view showing various wave forms of signals in the invention.

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

DESCRIPTION OF THE PREFERRED EMBODIMENTS

Figure 1:
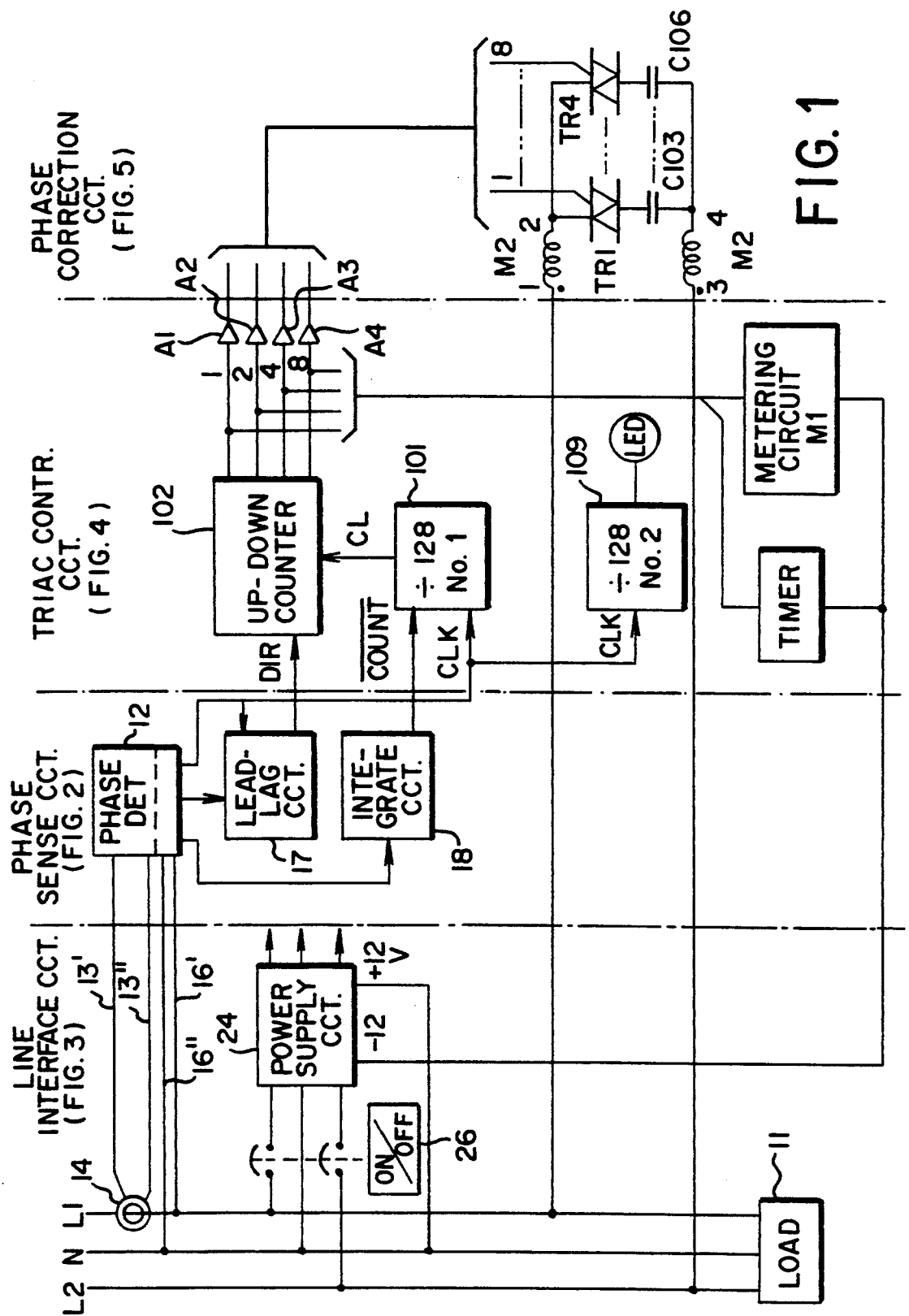
FIG. 1 is a block diagram of the invention showing its major parts.

FIG. 1 depicts a power line including power conductors L1, neutral N, and L2, wherein L1 and L2 are of opposite phase and the neutral N serves to equalize the load in the two conductors L1 and L2, as is conventional for single-phase power lines. It follows that the invention can be applied with minor modifications also to multiphase power lines such as, for example, three phase power lines. A load 11 is connected to the power line and is presumed to have a given power factor less than one, such that it draws an inductive current as well as a real current from the power line.

Figure 2:
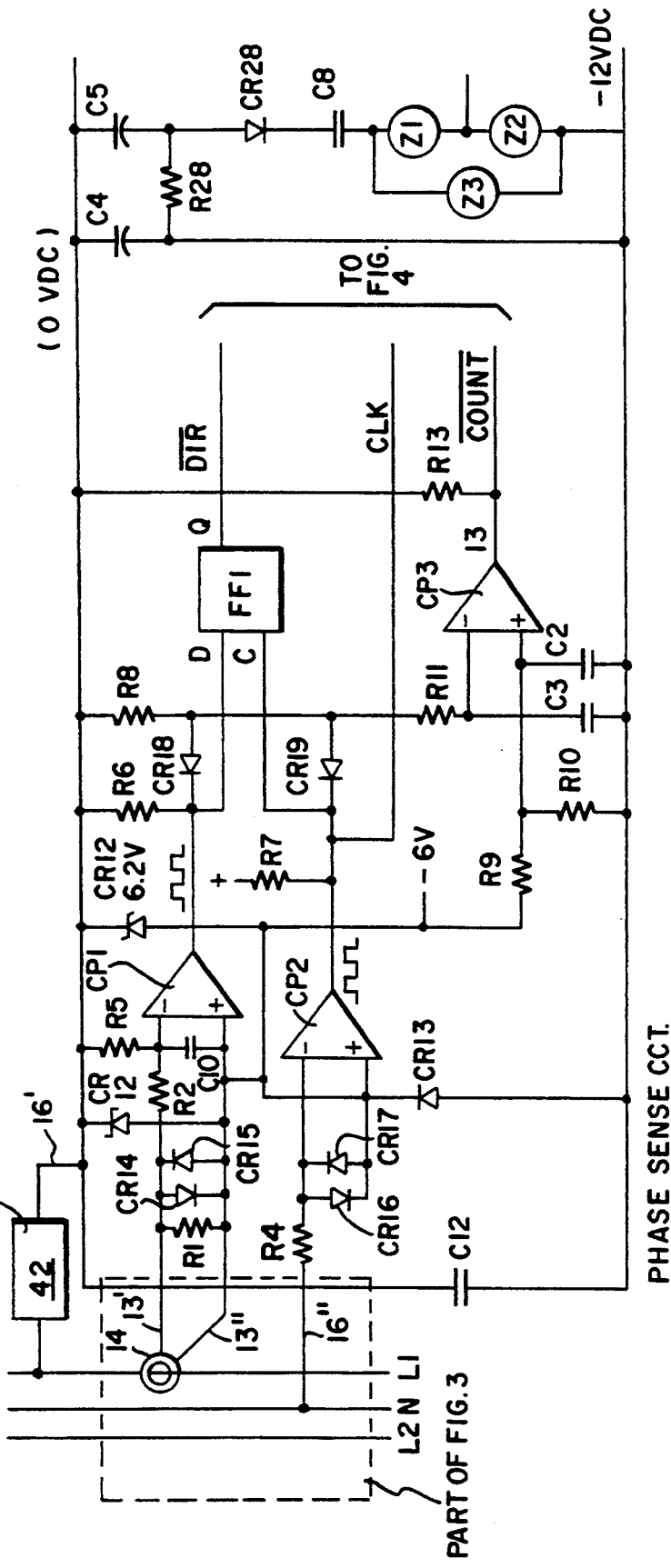
FIG. 2 is a circuit diagram of part of the invention showing the phase sense circuit.
Figure 3:
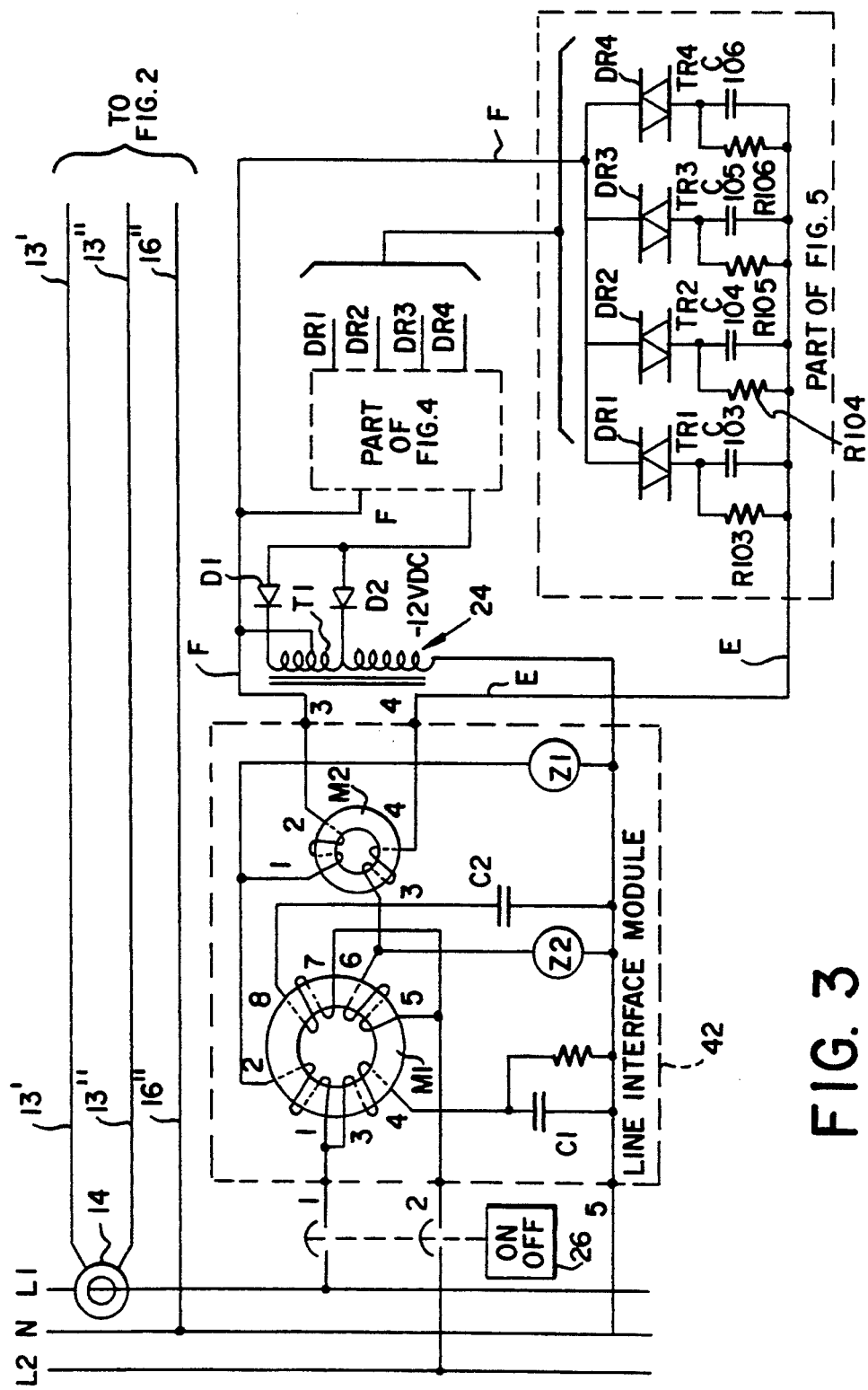
FIG. 3 is a circuit diagram of part of the invention showing the line interface circuit.

The apparatus shown in FIG. 1, which provides a general overview of the invention, operates to sense the phase shift between the current in conductor L1 and the voltage between conductors L1 and N by means of the phase sense circuit FIG. 2, connected to the power line via line interface circuit FIG. 3. The phase sense circuit has a phase detector 12 having first inputs 13', 13'' from a toroid current sensing coil 14 having the power conductor L1 going through the toroid coil as a primary winding, which induces in a secondary winding of the coil a voltage representing the AC current flowing in conductor L1 with a 90° phase shift. The second inputs 16', 16'' connected to conductors N and L1 transmit the voltage vector to the phase detector 12.

The phase detector 12, which is described in more detail below, cooperates with a lead-lag circuit 17 that determines if the current vector is leading or lagging and has an output (signal) DIR ("direction"), an integrate circuit 18 which determines if the phase shift is cancelled, i.e. if the power factor is corrected by generating a logic low on output lead COUNT' wherein "COUNT'" indicates a "no count condition". In the following description the inverse of any function is indicated by an apostrophy "'" after the function designation. In the drawings the inverse function is shown by a line above the function designation. The phase detector 12 also generates a clock signal CLK. The clock signal CLK is derived from the inputs 16', 16'', and is the reference for the power factor detector and the lead-lag circuit 17.

Figure 4:
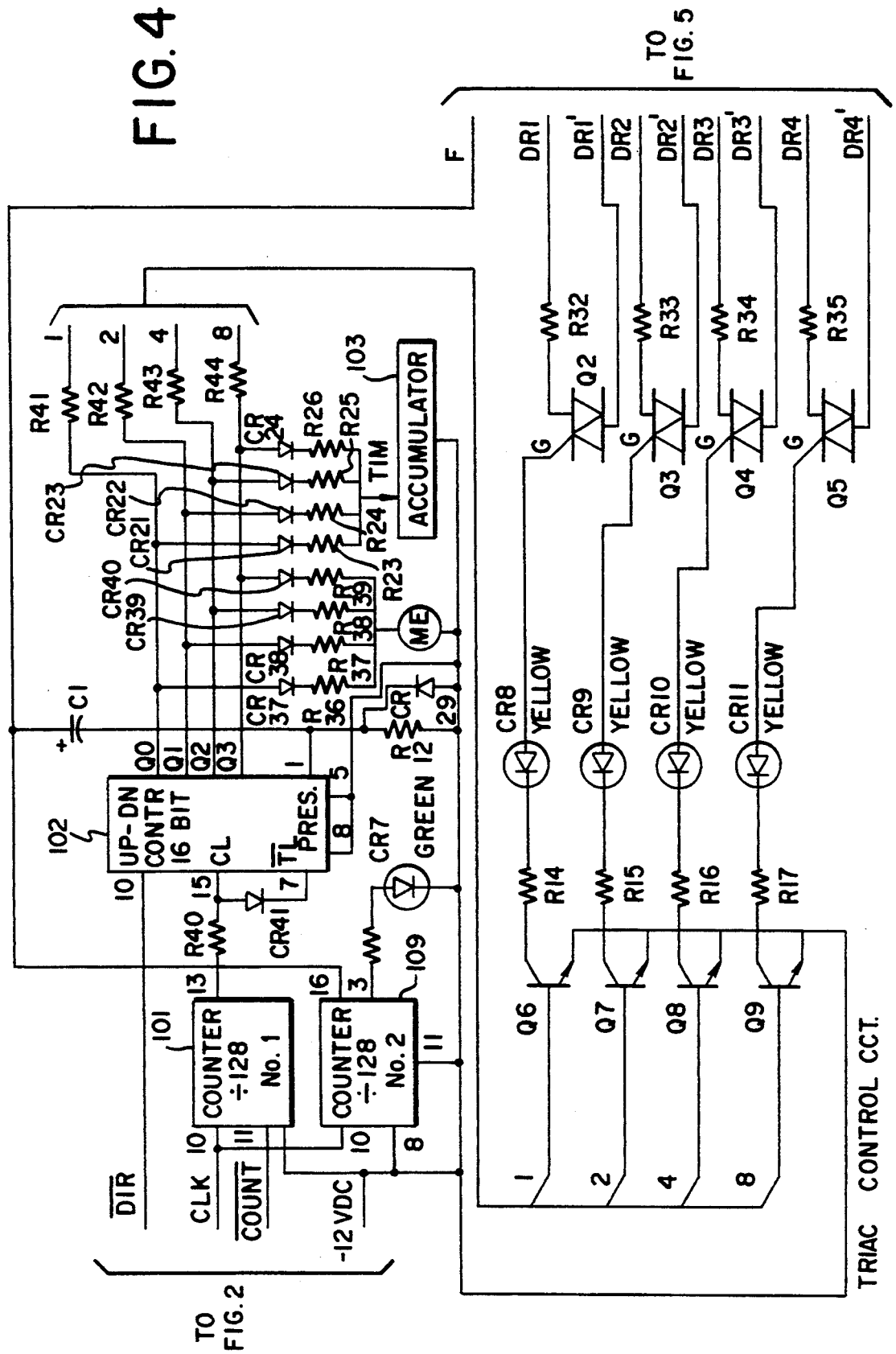
FIG. 4 is a circuit diagram of part of the invention showing the triac control circuit.
Figure 5:
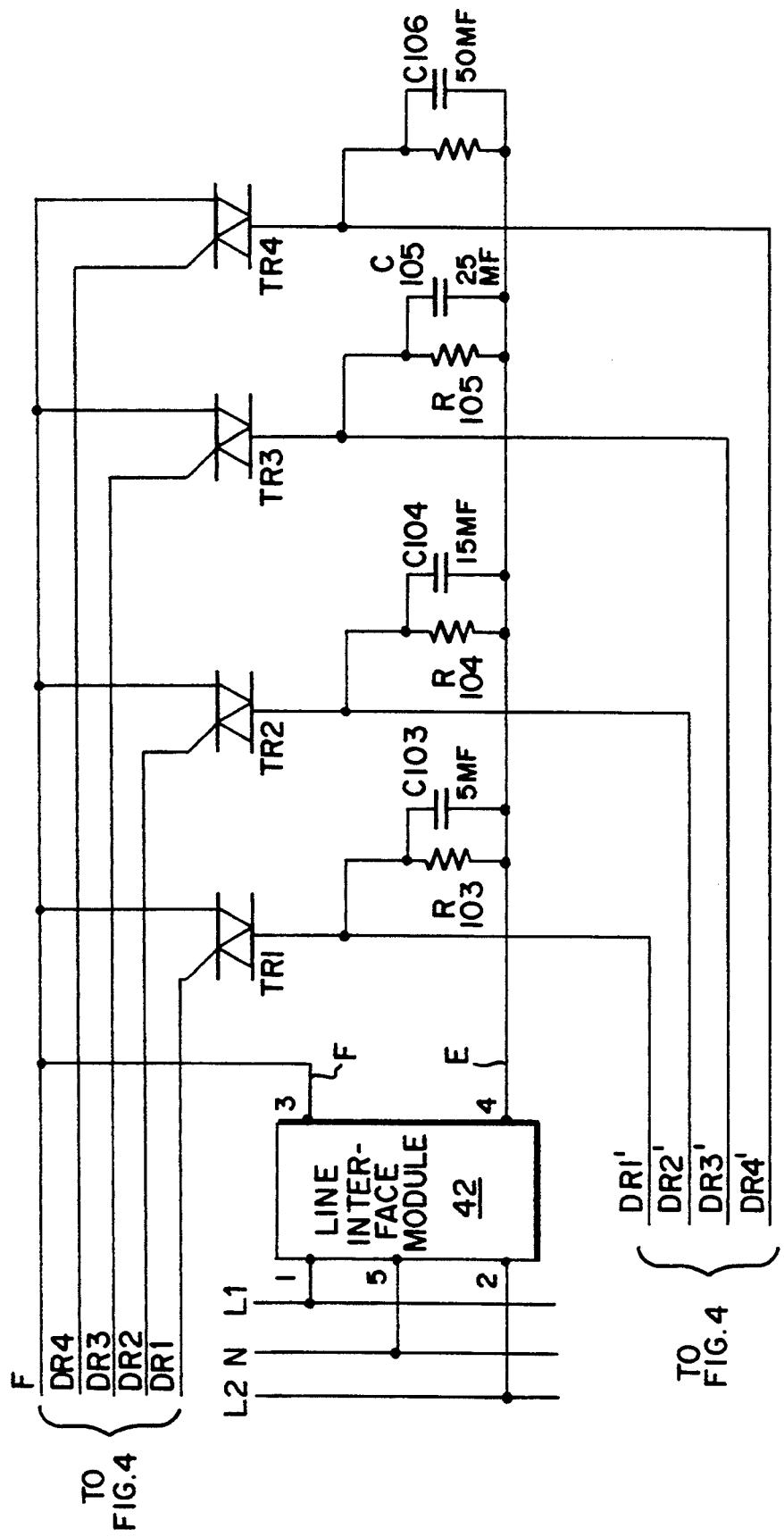
FIG. 5 is a circuit diagram showing the phase correction circuit.
Figure 7:
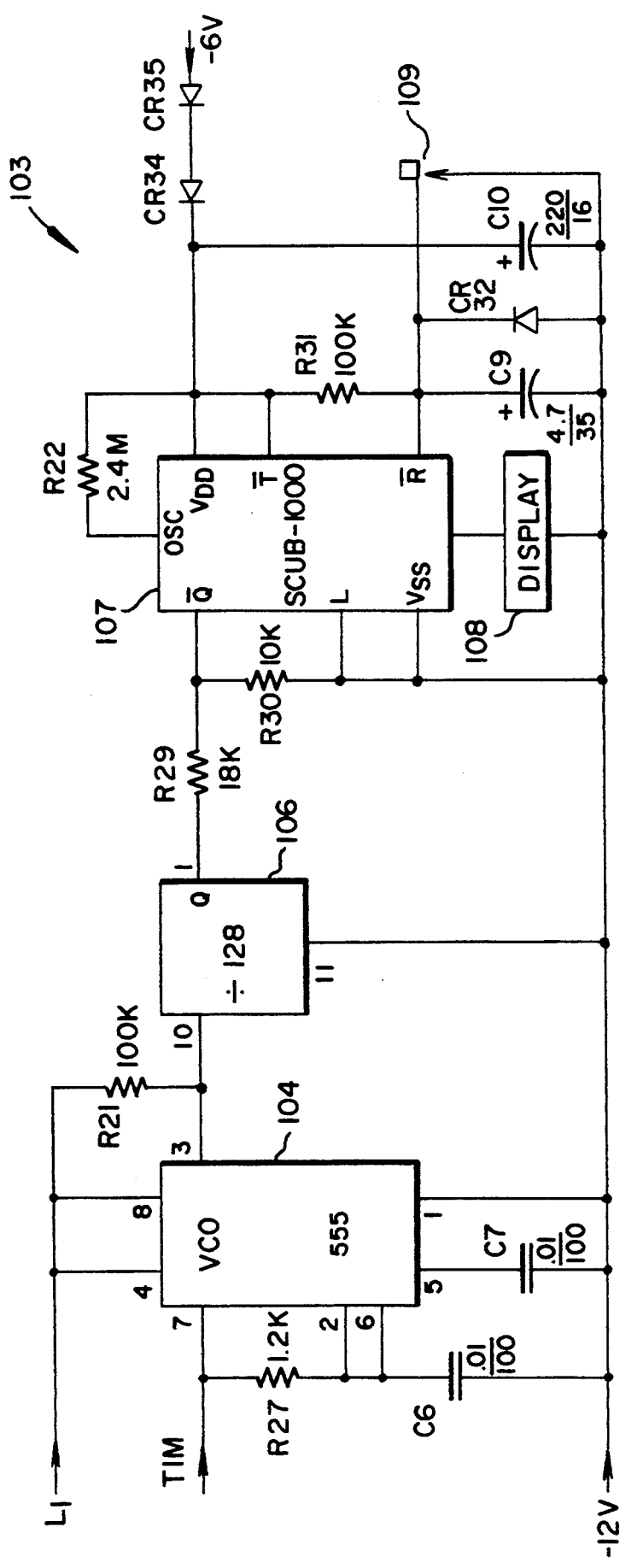
FIG. 7 is a circuit diagram showing the circuit of the VAR accumulator.

The three signals DIR, COUNT' and CLK control a triac control circuit, FIG. 4, which includes an up-down counter 102 that counts either up or down under control of lead DIR, and is driven by the clock signal CL via a divide-by-128 counter (#1) 101. The divide-by-128 circuit 101 also has a reset input connected to the COUNT' signal, that stops the counting if phase correction is attained. The up-down counter 102 is a binary counter having for example four binary weighted outputs 1,2,4 and 8, that each controls a triac in a group of four triacs TR1-TR4 in a phase correction circuit FIG. 5, via four triac drivers shown as amplifiers A1-A4.

The four triacs TR1-TR4 operate to connect any combination of four binary weighted capacitors C103-C106 between conductors L1' and L1'', in order to provide the proper amount of leading current to the power line required to perform the power factor correction.

A line interface circuit, FIG. 3, includes a power supply 24 and an on/off switch 26. The power supply provides −12 VDC Volt D.C. power referenced to the line L1, which accordingly is connected to the positive pole +12 VDC of the power supply 24.

The following description covers the individual circuits, mentioned above, in more detail.

Referring now to FIG. 3, the power line is composed of voltage-carrying conductors L1, L2 and a neutral conductor N, as is conventionally used in two-phase power distribution systems.

An energy storage/absorber including a toroid coil M1, capacitors C1,C8, protective devices Z1,Z2 and another toroid coil M2 serves to store electrical energy in the magnetic field of coil M1 and capacitors C1,C2, and to absorb line surges which are stored both magnetically and capacitively, and then returned to the power mains resulting in net energy savings. In addition, the energy required by the power factor correction circuit is coupled through coil M1, which magnetically cancels out any current/voltage surges that may be present on the line to protect the electronic components of the system. The voltage from coil M2 is next fed to autotransformer T1 which provides, via rectifier diodes D1,D2, a −12 VDC potential referenced to line N to provide the power for the electronic circuits of FIGS. 1,2,4,5 and 7.

FIG. 2 is a more detailed circuit diagram of the phase sense circuit, which receives from the toroid coil 14, via leads 13', 13" an AC-signal representing the current flow in conductor L1 in 90° lagging phase relation to the voltage vector on conductor L1, received via conductor 16". The voltage on conductors 13' and 13" is connected to respective inputs − and + of a first comparator CP1 via a protective network composed of resistor R1 in parallel with protective anti-parallel diodes CR14,CR15. A resistor R2 and capacitor C10 provide a 90° leading phase shift of the signal from the toroid 14. The phase-shifted signal has a voltage level high enough to drive the comparator CP1 into saturation in both positive and negative direction. As a result, the output signal from comparator CP1 is a first square wave signal representing the sinusoidal load current in conductor L1, with its zero-crossings corresponding to those of the load current.

The line voltage on conductor L1 is connected via lead 16" to a second comparator CP2 via a protective network composed of resistor R4, and protective anti-parallel diodes CR16,CR17 which similarly produces a second square wave output signal at its output. A diode CR13 is connected from −12 VDC with its cathode to the non-inverting input of comparator CP2 to prevent this input from going negative during a power transient. If the power factor of the load is equal to 1, the first and second square wave signals are in same phase corresponding to zero phase shift between the current in conductor L1 and the voltage on conductor L1, which will be the case when the power factor of the load has been corrected. Most often user loads have an inductive component with inductive loads. The current in conductor L1 will normally be lagging if no correction is applied. When correction is applied the current would be leading if too much correction were applied. This condition is prevented as described below.

The first and second square wave signals are combined in a combining circuit including diodes CR18 and CR19 and resistors R6,R7 and R8. The combining circuit operates essentially as a logic AND-gate, and as a result the junction formed by the common diode anodes will see the first and second square wave signals cancelled if they are in exact opposite phase, but not if they are out of phase, in which case the combined square wave will have short positive pulses representing the phase difference. These wave shapes are shown in FIG. 6, wherein Item a shows the first square wave signal, Item b the second square wave signal in exact 180° phase relation to Item a, Item c is the resulting signal as seen at the point of the common diode anodes. Item d is the same as Item b and Item e is similar to Item a, but shifted a small amount in phase relative to d, and the resulting square wave signal is shown in Item f, as seen at the point of the common diode anode junction.

The common anode junction is connected via resistor R11 to a third comparator CP3 connected as an integrator by means of resistor R11 and capacitor C3, connected at their common junction to the inverting input of comparator CP3, while its non-inverting input voltage is determined by means of resistors R9,R10, connected as a voltage divider across zener diode CR12 to provide a reference voltage for an integrated signal at the junction of resistor R11 and capacitor C3, and filtered by capacitor C2. The output of capacitor C3 shows an integrated signal like Item g of FIG. 6 which is slightly positive according to the degree of phase shift between the first and second square wave signal. If the phase shift is equal to zero, signal g will also be equal to zero, which corresponds to a logical zero signal as it is applied to the phase correction circuit seen in FIG. 4. If the phase shift is not equal to zero, a net voltage will be present on capacitor C3, which if great enough will cause a logic "1" to be present on the inverting input of comparator CP3, producing a logic "0" to be present on the output of comparator CP3, designated COUNT', which is used as a reset signal for divide-by-128 counter 101 in FIG. 4, as described below.

The first and second square wave signals are respectively connected to the D and C inputs of a D-type flip-flop FF1. This flip-flop transfers the data input on the D input only on the positive going edge of the input to the clock input C. Depending upon the phase shift between the voltage on conductor L1 and the current in conductor L1, the output Q of FF1 will be set high or low at the time when the clock signal, i.e. the second square wave signal from comparator CP2 changes from low to high. At the time of change the logic level at input D of FF1 will be transferred to output Q of FF1. This signal is applied as a direction signal DIR to indicate whether the current is leading or lagging.

The second square wave signal is also used as a clock signal CLK which drives the divide-by-128 counter 101 in FIG. 4.

The power factor correction circuit is arranged such that a power factor of 0.97 is the minimum to be corrected, which corresponds to a phase angle of approximately 14 degrees angle, providing an "on" time of 34%, i.e. 2.3 msec. per cycle. The third comparator, i.e. the integrating circuit CP3, detects this phase angle by comparing the integrated signal at the inverting input of CP3 with a voltage from a 6-to-1 voltage divider R9, R10 connected at its output to the non-inverting input of comparator CP3. The input to voltage divider R9,R10 is a reference voltage equal to 6.2 V generated by zener diode CR12. Accordingly, a 1.1 volt reference signal is present at the noninverting input to comparator CP3, i.e. the voltage at the inverting input of comparator CP3 is higher than the reference voltage at the non-inverting input, causing the output of CP3 to go low. A diode CR13 is connected with its cathode to the anode of the zener diode CR12, which prevents the voltage at the non-inverting input of the comparator CP2 from going negative during a power transient. The output of comparator CP3 represents the COUNT' signal described above, which resets the divide-by-128 counter 101 when the phase shift is within the stipulated value (FIG. 4).

In FIG. 4 the triac control circuit includes the first divide-by-128 counter 101, which divides the clock signal CLK by 128, and generates a divided clock output at pin 13 when the COUNT' signal at reset pin 11 is not active, which in turn drives a 16 bit up-down counter 102, having binary weighted outputs Q0,Q1,Q2 and Q3, which respectively represent binary values 1,2,4 and 8. As long as the COUNT signal is active, up-down counter 102 will accumulate positive or negative going transitions of clock signal CLK, and will either increment its outputs (Q0 through Q3), depending on the state of direction signal DIR, or decrement its outputs depending on the state of the direction signal DIR.

The first divide-by-128 counter 101, which divides the 60 Hz signal from conductor L1 by 128, presents a positive going pulse every 4.2 seconds at pin 13 of counter 101. If the COUNT signal goes inactive even instantaneously counter 101 is reset, and must start anew. This counting mode provides a low-pass filtering action, which effectively prevents noise and surges from affecting the up-down counter and suppresses any tendency for the entire circuit to "hunt" in the closed loop mode.

The inputs to the up-down counter 102 are the divided-by-128 clock signal at pin 15 of up-down counter 102, which arrives every 4.2 seconds as long as the power factor is less than 0.97, while the direction signal DIR at pin 10 determines whether the up-down counter 101 will count up or down. A pre-reset signal at pin 1 resets all registers in the up-down counter 102 to zero when power is initially applied, via capacitor C1 from power bus F which is metallically connected to conductor L1 of FIG. 3. Upon initial power-up capacitor C1 is discharged so that pin 1 (PRES) is at +12 volts for about 1.5 seconds or until pin 1 goes low. The direction signal DIR described above is connected to pin 10 of up-down counter 102. If the power factor is lagging, signal DIR will be high and the up-down counter 102 will be counting up, i.e. incrementing. Conversely, if the power factor is leading, signal DIR will be low and the up-down counter 102 will be counting down, i.e. decrementing.

The clock input CL of up-down counter 102 is connected via a diode CR41 to the carry-out (TL') pin 7, which prevents the up-down counter 102 from overflowing past count of 15 when incrementing, and past zero when decrementing.

The binary weighted outputs Q0–Q3 of the up-down counter 102 drive switching transistors Q6–Q9. Since all four transistors Q6–Q9 operate identically, only transistor Q6 will be described in detail. When output Q0 of up-down counter 102 goes high, base current, limited by R41, will flow into the base of transistor Q6, turning it on. This drives the collector to the −12 volt bus, allowing current to flow through R14 and yellow LED CR8, which will light up indicating that gate current is flowing in the drive triac Q2, turning it on. This causes triac Q2 to turn on main triac TR1, (FIG. 5) via resistor R32 and terminal DR1, connected to the gate of main triac TR1 in FIG. 5. The main triac TR1 is connected in series with capacitor C103, which has a value of 5 MF, and is connected via main triac TR1 to lead F, and via lead E between power conductors L1 and L2. It should be noted that the logic circuitry turns on the triacs only when the line voltage goes through zero potential. This prevents the triacs from turning on when the capacitors are charged which could allow large capacitor discharge currents to flow, which would damage the triacs. In order to provide that zero voltage is across each capacitor when the corresponding triac is turned on, a discharge resistor R103,R104,R105 and R106 (FIG. 5) is connected across each respective capacitor C103,C104,C105, and C106. These resistors have a value such that the respective capacitor is completely discharged in less than two seconds. Since no capacitor (C103–C106) can change from on to off potential in less than 4.2 seconds, it is assured that every capacitor is at zero potential before the corresponding thyristor can be turned on. The triacs are turned off when the drive current from output Q0 of up-down counter 102 goes low, turning off transistor Q6, which stops the flow of gate current from drive triac Q2. Q2 does not turn off immediately, but waits until the AC-current through it goes through zero, causing the gate current of each respective triac TR1-TR4 to go to zero. Since the current through the triac is also zero the triac turns off. This prevents the triacs from turning off while the capacitors C103–C106 are charged.

For further protection, all triacs TR1,TR2,TR3 and TR4 are connected to conductors L1,L2 through windings 1–2 and 3–4 of inductor M2, FIG. 3, which further suppresses current surges in the triacs. The other triacs TR2,TR3 and TR4 are similarly connected to conductors L1,L2, but are combined with capacitors C104,C105 and C106 having values 15 MF, 25 MF and 50 MF, which approximates a binary series. Depending upon the binary count stored in the up-down counter 102, a corresponding combination of capacitors C103–C106 will be connected to power conductors L1,L2 causing a corresponding correction of the power factor.

A metering circuit having a current meter ME (FIG. 4) is provided, which includes diodes CR37 through CR40, each in series with respective summing resistors R36 through R39, having respective values 16 k, 7.5 k, 3.9 k and 1.6 k, chosen such that they perform a binary to analog current conversion, thereby driving the meter ME to indicate the watts savings at the 240 volt AC potential. When up-down counter output Q0 goes high, approximately 0.53 ma flows in resistor R36. Similarly Q1 provides 1.1 ma, Q2 provides 2.1 ma, and Q3 provides 4.3 ma. These current values represent respective currents of 0.53 amps, 1.1 amps, 2.1 amps and 4.1 amps flowing through phase shifting capacitors C105 through C106. When all outputs Q0 through Q3 are high approximately 8 ma is supplied to the meter M1 indicating that 8 amperes reactive is being supplied to the power line conductors L1,L2. The meter is calibrated to "watts saving" at 240 volt AC, providing a power factor correction equal to 1, the full scale meter reading being 2000 watts.

An accumulator circuit 103 which provides the total volt-ampere (reactive) savings accumulated since a preceding reset of the accumulator, is provided. The accumulator circuit includes another digital-to-analog-converter similar to the one described for the metering circuit, and includes diodes CR21 through CR24 respectively connected to binary outputs Q0 through Q3 of the up-down counter 102. Each diode CR21 through CR24 is connected via respective binary weighted resistors R23 through R26 to the accumulator circuit 103, shown in more detail in FIG. 7. The common junction of resistors R23 through R26 is connected to input TIM, FIG. 7, of a voltage-controlled oscillator VCO 104, for example in the form of an astable multivibrator of the 555 type. The frequency-controlled output pin 3 of the VCO 104 is connected to a divide-by-128 counter 106 of conventional construction. The output Q of the divide-by-128 divider drives a twelve bit binary counter 107 via input pin 6. The accumulated count in counter 107 can be read on a conventional number display 107 which shows the accumulated volt-ampere-reactive accumulated since the last reset of the counter 107. A reset key 109 serves to reset the counter 107 after each reading. If the power is off for more than approximately 10 minutes, this prevents the counter from losing its count during brief power outages, but assures that the counter will indicate 00000 on initial turn-on.

A power-on indicator is provided in the form of an LED CR7, seen in FIG. 4. The power-on indicator is driven by a divide-by-128 counter 109, that divides the clock CLK so that CR7 flashes at a four second rate.

I claim:

1. An automatic power factor correcting device for correcting the power factor of a load connected to a power line having a plurality of conductors including a neutral conductor, comprising a power line interface circuit for interfacing the device with the power line, a phase sensing circuit connected via said interface circuit to at least two of said conductors for sensing a phase shift between voltage and current in said two conductors, a phase correction circuit including a plurality of weighted capacitors, and capacitor connecting means having a control input connected to said phase sensing circuit for connecting at least one of said weighted capacitors to said power line for correcting the phase shift on said two conductors.

2. An automatic power factor correcting device for correcting the power factor of a load connected to a power line having a plurality of conductors including a neutral conductor, comprising a power line interface circuit for interfacing the device with the power line, a phase sensing circuit connected via said interface circuit to at least two of said conductors for sensing a phase shift between voltage and current in said two conductors, a phase correction circuit including a plurality of weighted capacitors, capacitor connecting means having a control input connected to said phase sensing circuit for connecting at least one of said weighted capacitors to said power line for correcting the phase shift on said two conductors, up-down counting means responsive to said phase sensing circuit having outputs controlling said capacitor connecting means, a current sensing circuit in said phase sensing circuit coupled to a first one of said two conductors and a voltage sensing circuit connected between a first and second one of said two conductors, first and second comparators having inputs respectively connected to said current sensing circuit and to said voltage sensing circuit, said first and second comparators generating respective first and second square wave signals representing respectively current in said first one of said two conductors and voltage between said first one of said two conductors and said neutral conductor, a combining circuit having first and second inputs respectively receiving said first and second square wave signals for forming a combined signal, and an integrating circuit for integrating said combined signal connected to said combining circuit, forming an integrated output signal, wherein said integrated output signal forms a count signal for controlling said up-down counting means.

3. An automatic power factor correcting device according to claim 2, including in said phase sensing circuit a lead-lag circuit for detecting whether said current phase shift is leading or lagging relative to the voltage between said first conductor and said neutral conductor, said lead-lag circuit including a flip-flop having a data input connected to said first square wave signal and a clock input connected to said second square wave signal, for setting said flip-flop during leading phase shift conditions and resetting said flip-flop during lagging phase shift conditions, and an output of said flip-flop for generating a direction-of-count signal for controlling the direction-of-count of said up-down counting means.

4. An automatic power factor correcting device according to claim 3, including a clock output of said phase sense circuit, said clock output connected to said second comparator for generating a clock signal for driving said up-down counting means.

5. An automatic power factor correcting device according to claim 4, including in said controlled capacitor connecting means a triac in series with each of said weighted capacitors, and a triac control circuit for controlling said triacs.

6. An automatic power factor correcting device according to claim 5, including in said up-down counting means an up-down counter having binary weighted outputs connected to said triac control circuit for connecting a binary weighted combination of said weighted capacitors to said power line.

7. An automatic power factor correcting device according to claim 6, including a clock divide circuit having a clock input connected to said clock signal, clock dividing means in said clock divide circuit for dividing said clock signal by a given dividing number, and a divided clock output for providing a divided clock connected to a clock signal input of said up-down counter.

8. An automatic power factor correcting device according to claim 7 wherein said clock divide circuit has a dividing number equal to 128.

9. An automatic power factor correcting device according to claim 8 including a counter reset input in said clock divide circuit connected to said count signal, wherein said count signal has an inactive state, for resetting said clock divide circuit.

10. An automatic power factor correcting device according to claim 6, including a plurality of triacs in said capacitor connecting means, each triac having a gate connected to a respective one of said binary weighted outputs of said up-down counter, each triac connected to a respective one of said plurality of weighted capacitors.

11. An automatic power factor correcting device according to claim 10 including a plurality of triac drive amplifiers, each drive amplifier having an amplifier input and an amplifier output, a control gate on each of said triacs connected to a respective drive amplifier output, each of said amplifier inputs being connected to a respective binary weighted output of said up-down counter.

12. An automatic power factor correcting device according to claim 10, including a metering circuit, a meter having an input, a plurality of binary weighted resistors each having a series-connected diode, each of said binary weighted resistors having one end connected to a correspondingly weighted output of said up-down counter via a respective diode, and the other end of each resistor connected in parallel to said meter for indicating savings in watts being supplied by said correcting circuit.

13. An automatic power factor correcting device according to claim 10, including an accumulator for accumulating correcting reactive volt-ampere hours supplied to said power line, said accumulator including a plurality of binary weighted resistors, each having a series connected diode, each of said binary weighted resistors having one end connected via a respective diode to a correspondingly weighted output of said up-down counter, and the other end of each of said resistors connected to a common junction point, a voltage controlled oscillator having a frequency control input connected to said common junction point and a variable frequency output, an accumulating counter display connected to said voltage controlled oscillator, and display means having an input connected to said accumulating counter for displaying accumulated contents of said accumulating counter.

14. An automatic power factor correcting device according to claim 7, including another clock divide circuit having a clock divide input connected to said clock input and a divided clock input, and a light indicator connected to said clock divide output for providing a flashing indication when said power factor correcting circuit is operating.

15. An automatic power factor correcting device according to claim 1, wherein said plurality of conductors include a first phase conductor, a neutral conductor and a second phase conductor.

16. An automatic power factor correcting circuit according to claim 15, wherein said first phase conductor carries voltage of opposite phase of the second phase conductor.

* * * * *